July 9, 1929. W. H. WELCH 1,720,614
TIRE REMOVER
Filed Feb. 15, 1928
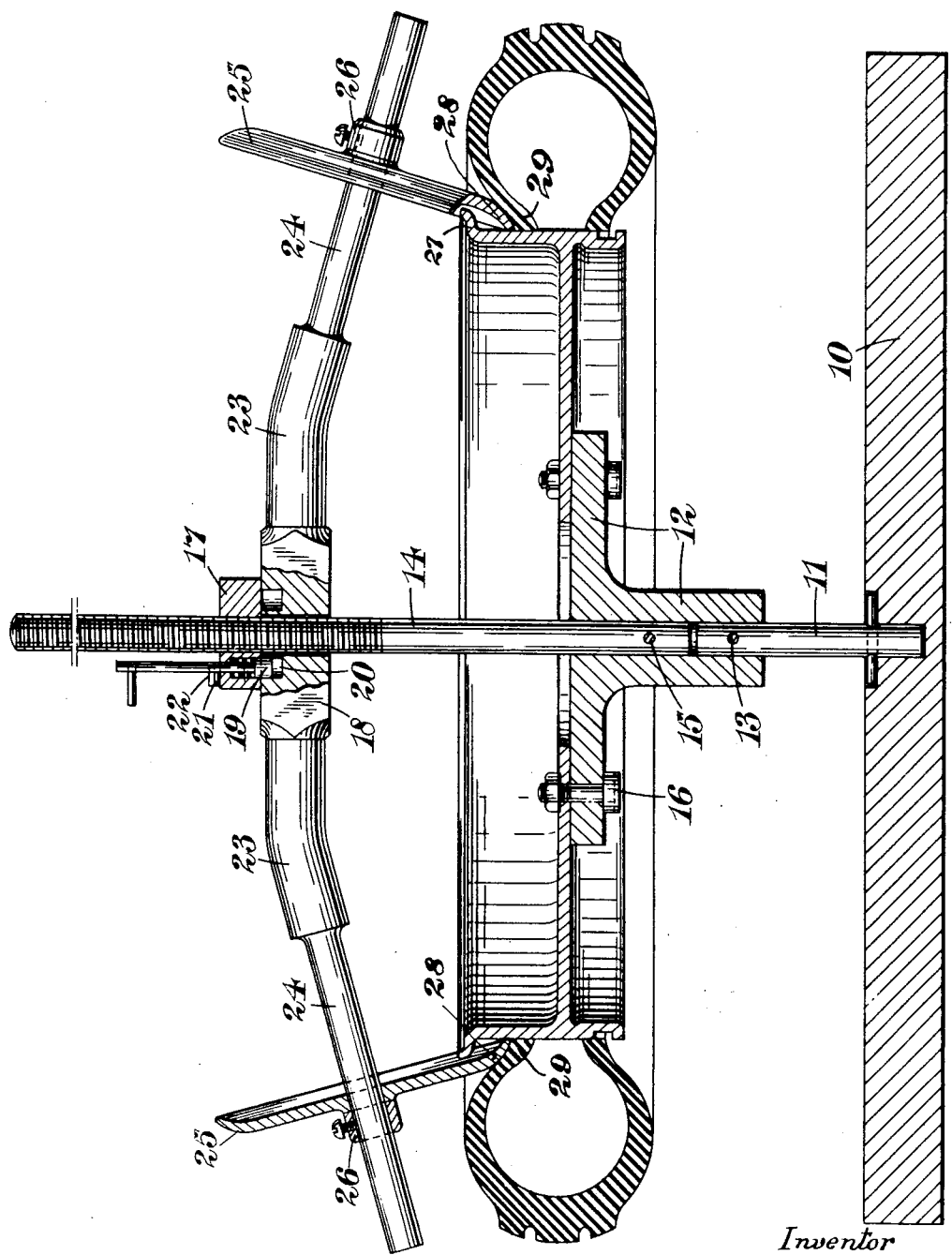
Inventor
W. H. Welch
by Wilkinson & Giusta
Attorneys.

Patented July 9, 1929.

1,720,614

UNITED STATES PATENT OFFICE.

WALTER HENRY WELCH, OF BRISTOL, ENGLAND.

TIRE REMOVER.

Application filed February 15, 1928, Serial No. 254,491, and in Great Britain December 2, 1927.

This invention is for an improved apparatus for manipulating tires. Difficulty is frequently experienced in removing tires from the wheels or rims whereon they are mounted, particularly in the case of the large tires used on heavy vehicles and known as "giant" tires. Such tires are usually secured in place by a detachable flange and locking-ring as hereinafter described, but in use the tire may become rusted on to the rim on which it is initially a tight fit, so that with the ordinary methods in use at the present time it is sometimes impossible to remove the tire. It has to be cut off.

More specifically, the invention is concerned with tire-manipulating devices of the type comprising a support to receive a tire and rim, which rim may be separable from or integral with the wheel, one or more pressure-members, means for traversing (e. g. with a rolling motion) said member or members over the part to be pressed (e. g. the detachable flange of the rim, or the tire) and simultaneously producing relative movement between said member or members and the part to be pressed substantially in the direction in which pressure is to be exerted, for example, by imparting a helical movement to the pressure-member or members about the axis of the tire being treated.

One object of the invention is to provide a simple and efficient device of the aforesaid type whereby straight-sided tires can be readily removed from or mounted on a rim.

According to the present invention, there is provided a tire-manipulating device of the type referred to wherein the pressure-member or members is or are carried by a member that is rotatable about the axis of the tire, and wherein said pressure-member or members is or are so constructed and mounted on the carrying-member that the pressure will be exerted in a direction that is inclined obliquely to the axis of the tire.

Other details of the invention are hereinafter described in relation to a specific embodiment of it and the novel features are pointed out in the claims appended to this specification.

In the accompanying drawing, which represents in sectional elevation one construction of device according to the present invention, the reference 10 indicates the base upon which there is mounted a column 11, and on this column there is secured a table 12. This table may for convenience be detachable, being secured by a pin 13 passing through the socket on the table and the column. A pillar 14 is mounted centrally on the table, conveniently engaging a central bore therein and being retained by a removable pin 15, so that the pillar can be easily removed if so desired. The table 12 is arranged to receive adjustable bolts 16 in slots or holes, these bolts being used if desired to secure a wheel on the table by engaging the openings therein which are provided for its ordinary retaining bolts.

The pillar 14 is screw-threaded at its upper end, and a nut-member 17 is engaged with the thread. A hub-like member or disc 18 is provided with a bore of sufficient diameter to allow it freely to encircle the screw-threaded portion of the pillar 14 so that it is rotatable and movable endwise thereon without engaging the screw-thread. Means are provided for rotatably engaging the nut-member 17 and the part 18, such means comprising for example a spring-controlled plunger 19 which is carried in the nut-member and can be projected therefrom to engage a notch 20 in the part 18. The plunger 19 is provided with a detent-pin 21 so that the plunger can be withdrawn from engagement with the recess 20 and the pin 21 engaged with a ledge 22 which will retain the plunger in its inoperative position.

The part 18 carries two radial arms 23 and thus constitutes a spider which arms are each cylindrical as to its outer part 24, and these parts are inclined out of the plane normal to the pillar 14 in which the part 18 rotates. On each of the parts 24 a disc-like member 25 is mounted so that it can rotate freely; its position on the arm 24 is determined by a suitable stop 26. These disc-like members are dished, as shown in the drawing, to accommodate the usual integral retaining flange 27 on the tire-rim and to permit the operative edge of the disc to enter beneath the retaining flange and to press on the inner edge 29 of the tire where it bears against the rim.

As stated above, the principal use of this device is for the removal of tires from wheels or rims, particularly the large tires known as "giant" tires, which after a period of use are sometimes extremely difficult to remove by any of the known methods.

As is well known, giant tires are usually mounted on a rim which has an integral retaining flange on one side and a detachable flange on the other side; the detachable flange is of a size that will pass over the base of the rim, and it is retained in place by a separate locking-ring which engages in a small recess or behind a small lip formed on the rim; this locking-ring projects radially a sufficient distance to provide retaining support for the detachable flange.

Assuming such a tire is to be removed from the wheel or rim, the pillar 14 is removed from its socket so that the surface of the table 12 is easily accessible for placing the wheel thereon with its detachable flange uppermost. Such wheels and tires are usually heavy and are of considerable weight, but by removing the pillar 14 one operator can slide the wheel into position on the table; it is arranged centrally thereon and if necessary secured by the bolts 16. The pillar 14 is then replaced and the part 18 is mounted on it and the nut-member 17 is also screwed on into proximity with the part 18. The wheels or discs 25 are then adjusted each along its arm 24 so that its edge bears on the detachable flange. The nut-member is screwed down and engaged by the plunger 19 with the part 18. The part 18 is then rotated by hand in such a direction that the movement of the nut is downwards; the part 18 is thereby forced downwards very slowly and the tire is compressed by pushing the detachable flange away from the locking-ring. As soon as it is clear one end of the locking-ring is pried out of its groove, and one of the discs 25 is then adjusted so that it enters between the rim and the locking-ring, and the part 18 is rotated through a revolution, thereby completely releasing the locking-ring. The locking-ring is removed and the detachable flange is thus free to be lifted off. The tire is then free, but usually it is such a tight fit on the rim or is rusted on so that it is not of itself easily removable. The pillar 14 is again removed and the wheel and tire is turned upside-down on the table so that the fixed flange on the rim is uppermost, as is illustrated in the accompanying drawing. The column 14 is replaced and the discs 25 are adjusted so as to bear on the bead of a tire as close as is possible to the rim, and the downward pressing motion is again applied to the tire in the same manner as before by engaging the nut 17 with the part 18. Continued rotation of the part 18 forces the tire downwards over the rim. Owing to the comparatively small pitch of the screw-thread on the pillar 14, a very considerable mechanical advantage is obtained, and any tire can be removed from its rim in a short space of time without difficulty.

The device can also be used for mounting new tires on wheels or rims, and the operations are similar. If difficulty is experienced in entering the first bead of the tire on to the rim, the part 18 may be turned upside-down so that the arms 24 are inclined upwardly away from the tire and the discs 25 are engaged with the beads and slowly fed downwards until they are engaged with the rim. The detachable flange is then put in place and the discs 25 engaged with it to complete the pressing-on of the tire on to the rim. This movement is continued until the detachable flange has been pressed on so far as to permit the easy insertion of the locking-ring which is sprung into place, thereby securely retaining the tire in position.

When a tire is to be removed from a rim, as distinct from a wheel, suitable bars are provided to extend from the table to the rim to provide the desired support for it.

Whilst a particular embodiment of this invention has been described, it will be appreciated that various modifications may be made in the details of construction. Thus for example, the pressure-members are shown as discs which are provided with a lip or flange at their periphery to give a suitable formation for engaging the tire or detachable flange without damage thereto, but other suitable shapes may be used.

I claim:

A tire remover, comprising in combination a support for a tire and rim, a pressure-member carrier mounted for rotation about the tire axis, pressure-members carried thereby and arranged to exert pressure on the part to be moved in a direction that is inclined obliquely to the axis of the tire, a central screw threaded pillar on which said carrier is freely movable axially, a nut-member engaging the screw thread on the pillar, and means for locking the carrier and said nut-member, together so as to impart a helical movement about the tire axis to the pressure-members when the carrier is rotated, which locking means comprises a spring-controlled plunger carried by one of the parts to be locked together and adapted to engage a notch in the other part, and means to retain the plunger in its inoperative position.

In testimony whereof I affix my signature.

WALTER HENRY WELCH.